United States Patent
Islam et al.

(10) Patent No.: US 10,645,727 B2
(45) Date of Patent: May 5, 2020

(54) DIRECTIONAL RECEPTION AND PERIODIC RTS/CTS TRANSMISSION TO ESTIMATE INTERFERENCE

(71) Applicant: QUALCOMM Incorporated, San Diego, CA (US)

(72) Inventors: Muhammad Nazmul Islam, Edison, NJ (US); Sundar Subramanian, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/695,672

(22) Filed: Sep. 5, 2017

(65) Prior Publication Data

US 2018/0184457 A1    Jun. 28, 2018

Related U.S. Application Data

(60) Provisional application No. 62/439,569, filed on Dec. 28, 2016.

(51) Int. Cl.
*H04W 72/04* (2009.01)
*H04W 74/08* (2009.01)
(Continued)

(52) U.S. Cl.
CPC ...... *H04W 74/0816* (2013.01); *H04B 7/0617* (2013.01); *H04B 7/0695* (2013.01);
(Continued)

(58) Field of Classification Search
CPC . H04W 74/0816; H04W 24/08; H04W 24/10; H04W 72/082; H04W 88/08; H04L 43/16
See application file for complete search history.

(56) References Cited

U.S. PATENT DOCUMENTS 8,666,319 B2    3/2014  Kloper et al.
2010/0304680 A1*  12/2010  Kuffner ............... H04B 7/10
                                                455/63.1
(Continued)

FOREIGN PATENT DOCUMENTS

GB          2455792 A  *  6/2009  ........ H04W 74/0816
WO    WO-2015060758 A1    4/2015
(Continued)

OTHER PUBLICATIONS

International Search Report and Written Opinion—PCT/US2017/064238—ISA/EPO—dated Mar. 14, 2018.

*Primary Examiner* — Hassan Kizou
*Assistant Examiner* — Mahbubul Bar Chowdhury
(74) *Attorney, Agent, or Firm* — Holland & Hart LLP

(57) ABSTRACT

A transmitting device may determine that a first neighbor device is communicating with a second neighbor device based on a signal received from the first device (e.g., a request-to-send (RTS) signal) during a listen-before-talk (LBT) period. The transmitting device may also identify a direction of the second neighbor device (e.g., based on signals received during a previous LBT period), and determine the amount of interference that a directional transmission may cause at the second neighbor device. The determination may be based on whether the transmission direction (i.e., a beam direction of a directional transmission) is in a same direction as the second neighbor device. If the interference level is below a threshold, the transmitting device may perform the transmission despite receiving the signal during the LBT period. If the interference level is above the threshold, the transmitting device may refrain from transmitting.

29 Claims, 16 Drawing Sheets

(51) Int. Cl.
  *H04W 72/08* (2009.01)
  *H04W 24/10* (2009.01)
  *H04W 24/08* (2009.01)
  *H04L 12/26* (2006.01)
  *H04B 7/06* (2006.01)
  *H04W 88/08* (2009.01)

(52) U.S. Cl.
  CPC ........... *H04B 7/0697* (2013.01); *H04L 43/16* (2013.01); *H04W 24/08* (2013.01); *H04W 24/10* (2013.01); *H04W 72/082* (2013.01); *H04W 88/08* (2013.01)

(56) References Cited

U.S. PATENT DOCUMENTS

| | | | |
|---|---|---|---|
| 2013/0039345 A1* | 2/2013 | Kim | H04W 72/046 370/332 |
| 2016/0037560 A1 | 2/2016 | Liu et al. | |
| 2016/0278123 A1* | 9/2016 | Baldemair | H04W 74/08 |
| 2016/0353467 A1 | 12/2016 | Nekovee | |
| 2018/0220461 A1* | 8/2018 | Shi | H04L 12/413 |

FOREIGN PATENT DOCUMENTS

| WO | WO 2016029406 A1 | 3/2016 |
|---|---|---|
| WO | WO-2016144506 A1 | 9/2016 |
| WO | WO 2017052444 A1 | 3/2017 |

\* cited by examiner

DIRECTIONAL RECEPTION AND PERIODIC RTS/CTS TRANSMISSION TO ESTIMATE INTERFERENCE

CROSS REFERENCES

The present Application for Patent claims priority to U.S. Provisional Patent Application No. 62/439,569 by Islam et al., entitled "Directional Reception and Periodic RTS/CTS Transmission to Estimate Interference," filed Dec. 28, 2016, assigned to the assignee hereof.

BACKGROUND

The following relates generally to wireless communication, and more specifically to directional reception and periodic request-to-send (RTS) or clear-to-send (CTS) transmission to estimate interference.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless systems, a base station or a UE may perform a listen-before-talk (LBT) procedure before gaining access to a transmission medium. In some cases, the LBT procedure may include an omni-directional energy or preamble detection. Thus, a device may refrain from transmitting to a receiving device in one direction to avoid "stepping on" the transmissions of devices in another direction. This may result in substantial delays before a device achieves access to the wireless medium, which may cause delays and disruptions in communication.

SUMMARY

A transmitting device may determine that a first neighbor device is communicating with a second neighbor device based at least in part on a signal received from the first device (e.g., a request-to-send (RTS) signal). The transmitting device may also identify a direction of the second neighbor device (based at least in part on, e.g., the previously received signals), and then determine the amount of interference that a directional transmission would cause at the second neighbor device. The determined amount of interference may depend on whether the transmission direction (i.e., a beam direction of the directional transmission) is in approximately the same direction as the second neighbor device. If the determined interference level is below a threshold, the transmitting device may perform the transmission despite receiving the RTS. If the interference level is above the threshold, the transmitting device may refrain from transmitting.

A method of wireless communication is described. The method may include receiving a first transmission from a first wireless device, identifying a direction of a second wireless device, estimating an interference level that would be imposed by a second transmission at the second wireless device, and determining whether to transmit the second transmission based at least in part on the estimated interference level, the first transmission, and the direction of the second wireless device.

An apparatus for wireless communication is described. The apparatus may include means for receiving a first transmission from a first wireless device, means for identifying a direction of a second wireless device, means for estimating an interference level that would be imposed by a second transmission at the second wireless device, and means for determining whether to transmit the second transmission based at least in part on the estimated interference level, the first transmission, and the direction of the second wireless device.

Another apparatus for wireless communication is described. The apparatus may include a processor, memory in electronic communication with the processor, and instructions stored in the memory. The instructions may be operable to cause the processor to receive a first transmission from a first wireless device, identify a direction of a second wireless device, estimate an interference level that would be imposed by a second transmission at the second wireless device, and determine whether to transmit the second transmission based at least in part on the estimated interference level, the first transmission, and the direction of the second wireless device.

A non-transitory computer-readable medium for wireless communication is described. The non-transitory computer-readable medium may include instructions operable to cause a processor to receive a first transmission from a first wireless device, identify a direction of a second wireless device, estimate an interference level that would be imposed by a second transmission at the second wireless device, and determine whether to transmit the second transmission based at least in part on the estimated interference level, the first transmission, and the direction of the second wireless device.

In some examples of the method, apparatus, and non-transitory computer-readable medium described above, the first transmission from the first wireless device may be received during an LBT period.

In some examples of the method, apparatus, and non-transitory computer-readable medium described above, the first transmission from the first wireless device may be received using an unlicensed radio frequency spectrum band.

In some examples of the method, apparatus, and non-transitory computer-readable medium described above, the first transmission from the first wireless device may be received using a radio frequency spectrum band used by licensed and unlicensed networks.

In some examples of the method, apparatus, and non-transitory computer-readable medium described above, the second transmission comprises a directional transmission having a beam direction, wherein the determination to transmit the second transmission may be based at least in part on the beam direction.

Some examples of the method, apparatus, and non-transitory computer-readable medium described above may further include processes, features, means, or instructions for monitoring one or more receiving directions, wherein the direction of the second wireless device may be identified based at least in part on the monitoring, and the interference level may be estimated based at least in part on the direction of the second wireless device.

Some examples of the method, apparatus, and non-transitory computer-readable medium described above may further include processes, features, means, or instructions for receiving an RTS or a clear-to-send (CTS) training signal from the second wireless device, wherein the direction of the second wireless device may be based at least in part on receiving the RTS or CTS training signal.

Some examples of the method, apparatus, and non-transitory computer-readable medium described above may further include processes, features, means, or instructions for monitoring one or more receiving directions. Some examples of the method, apparatus, and non-transitory computer-readable medium described above may further include processes, features, means, or instructions for determining that the first wireless device may be transmitting the first transmission.

Some examples of the method, apparatus, and non-transitory computer-readable medium described above may further include processes, features, means, or instructions for receiving an RTS or a CTS training signal from the first wireless device, wherein determining that the first wireless device may be transmitting may be based at least in part on receiving the RTS or CTS training signal.

In some examples of the method, apparatus, and non-transitory computer-readable medium described above, the first transmission comprises an RTS or a CTS message.

In some examples of the method, apparatus, and non-transitory computer-readable medium described above, the interference level may be estimated based at least in part on a direction of the second transmission, the direction of the second wireless device, the first transmission, or any combination thereof.

Some examples of the method, apparatus, and non-transitory computer-readable medium described above may further include processes, features, means, or instructions for determining that the interference level may be below a threshold. Some examples of the method, apparatus, and non-transitory computer-readable medium described above may further include processes, features, means, or instructions for transmitting the second transmission based at least in part on the determination.

Some examples of the method, apparatus, and non-transitory computer-readable medium described above may further include processes, features, means, or instructions for selecting a transmission power for transmitting the second transmission based at least in part on a direction of the second transmission and the direction of the second wireless device.

Some examples of the method, apparatus, and non-transitory computer-readable medium described above may further include processes, features, means, or instructions for determining that the interference level may be above a threshold. Some examples of the method, apparatus, and non-transitory computer-readable medium described above may further include processes, features, means, or instructions for refraining from transmitting the second transmission based at least in part on the determination.

Some examples of the method, apparatus, and non-transitory computer-readable medium described above may further include processes, features, means, or instructions for monitoring a plurality of directions across an angular coverage area according to a sweeping pattern.

In some examples of the method, apparatus, and non-transitory computer-readable medium described above, the plurality of directions comprises a subset of the directions within the angular coverage area.

Some examples of the method, apparatus, and non-transitory computer-readable medium described above may further include processes, features, means, or instructions for selecting the plurality of directions based at least in part on a range of a calibration error, a lack of downlink/uplink beam correspondence, information received from a network entity, a collision history, or any combination thereof.

Some examples of the method, apparatus, and non-transitory computer-readable medium described above may further include processes, features, means, or instructions for receiving a measurement report. Some examples of the method, apparatus, and non-transitory computer-readable medium described above may further include processes, features, means, or instructions for determining a receiving beam direction. Some examples of the method, apparatus, and non-transitory computer-readable medium described above may further include processes, features, means, or instructions for determining the downlink/uplink beam correspondence based at least in part on the reception beam direction.

DETAILED DESCRIPTION

Figure 1:
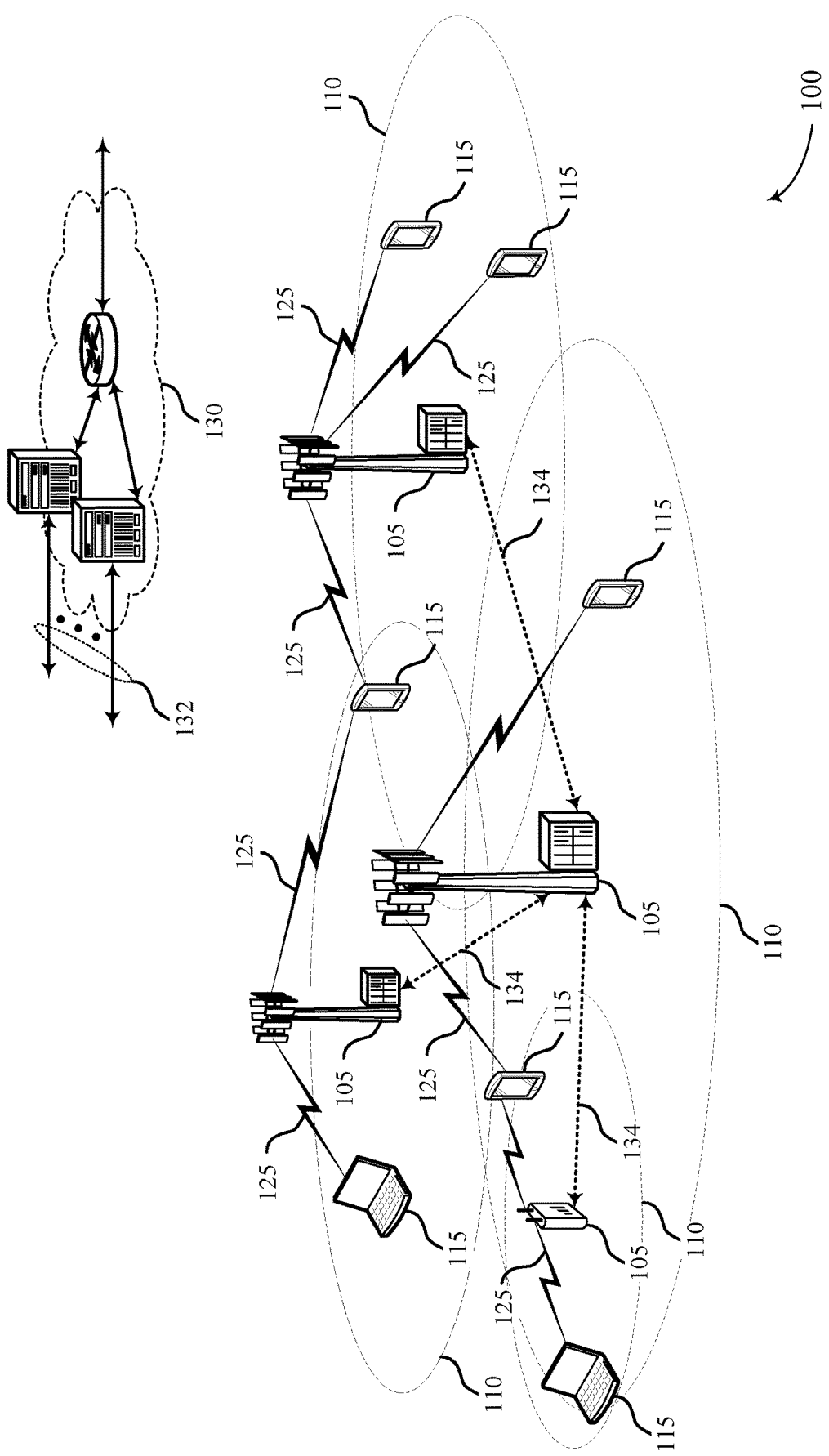
FIG. 1 illustrates an example of a wireless communications system that supports directional reception and periodic request-to-send (RTS) or clear-to-send (CTS) transmission to estimate interference in accordance with aspects of the present disclosure.

In some wireless systems, a wireless device (e.g., a base station) may perform a listen-before-talk (LBT) procedure to gain access to a shared medium. The base station may listen in an omnidirectional or pseudo-omnidirectional mode, sweeping a region of transmission for the LBT procedures. In some cases, the base station receives a signal during the LBT procedure, the base station may back off its transmission to avoid interference. In some cases, however, even if the base station detects a transmission via its LBT procedure, the base station may still transmit, despite a risk of interference due to the detected transmission. This transmission by the base station may use a directional beam, which may not interfere with neighboring devices that are located outside the area of the directional transmission beam. Thus, if the base station backs off from transmitting, the transmission may not have actually affected communication between neighboring devices.

To avoid unnecessary back off, the base station may determine an interference level that a directional transmission would cause a device at a particular location. If the determined interference level is below a threshold, the base station may still transmit using a directional beam. In some cases, the interference level may be determined based on the direction of the device and a direction of the directional beam. This may improve the speed or likelihood of gaining access to the transmission medium.

In some examples, the base station may determine the location of a neighboring device using a directional LBT procedure. The signals used to determine the location of the neighboring device may be transmitted during a request-to-send (RTS) or a clear-to-send (CTS) training period (i.e., an RTS/CTS signals may be transmitted for training purposes, and may not represent an actual attempt at communication between the neighboring devices). In addition to identifying the location of neighboring devices, a base station may determine whether a pair of neighboring devices are communicating with each other. This information may be used to infer whether an RTS received by one neighboring device indicates that a transmission will subsequently be received at that neighboring device or at another nearby neighboring device.

In some examples, the base station may determine whether to transmit based on the directions of the neighboring devices. For example, neighboring devices may include a neighboring base station and a neighboring user equipment (UE). The base station may listen for transmissions from neighboring base stations after preparing a transmission. In some cases, the base station may perform a directional LBT procedure in a direction of the neighboring base station, or the base station may detect an RTS from a neighboring device after transmitting a CTS to a recipient device for the transmission. If the base station detects a transmission (e.g., an RTS/CTS signal), the base station may determine that the neighboring base station is preparing to transmit. The base station may determine a level of interference that its own transmission may cause to the UE and neighboring base station based on the position of and direction of communication between the UE and neighboring base station. The base station may then determine whether to transmit using a directional transmission beam based on the determined interference level, the direction of the UE and neighboring base station, the direction of the transmission beam, or any combination thereof. If the interference level is greater than a threshold, the base station may refrain from transmitting. Or, if the interference level is less than the threshold, the base station may continue to transmit. For example, if the direction of the transmission beam and the direction of the UE are close together, the base station may not transmit. However, if, for example, the direction of the transmission beam and the direction of the UE are not close together, the base station may transmit, as the transmission may not affect communication between the neighboring base station and the UE. Accordingly, the base station may reduce unnecessary back offs if the base station detects a communication in a direction different than a pending transmission.

Aspects of the disclosure are initially described in the context of a wireless communications system. Aspects of the disclosure are further illustrated by and described with reference to illustrations of LBT procedures, apparatus diagrams, system diagrams, and flowcharts that relate to directional reception and periodic RTS/CTS transmission to estimate interference.

FIG. 1 illustrates an example of a wireless communications system 100 that supports directional reception and periodic RTS or CTS transmission to estimate interference in accordance with aspects of the present disclosure. The wireless communications system 100 includes base stations 105, UEs 115, and a core network 130. In some examples, the wireless communications system 100 may be a Long Term Evolution (LTE) (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. A wireless device with a pending transmission operating in wireless communications system 100 may determine direction information of other communicating devices. Then, the wireless device may determine whether to transmit based on a direction of communication between the other communicating devices and a direction of a the wireless device's own transmission.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT)

device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP Multimedia Subsystem (IMS), and a Packet-Switched (PS) Streaming Service (PSS).

Wireless communications system 100 may operate in an ultra high frequency (UHF) frequency region using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference. In some examples, a base station 105 may select a beam for transmission based on position information of other UEs 115 and base stations 105, for example to reduce interference.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ LBT procedures to ensure the channel is clear before transmitting data. A base station 105 may listen for signals (e.g., during an LBT time period or after transmitting a CTS signal) and determine interference levels based on signals received during the period. A neighboring UE 115 and base station 105 may also transmit training RTS/CTS signals such that the base station 105 can identify position information (e.g., a transmission direction) for the neighboring devices. The base station 105 may determine whether to transmit based on the interference levels and the direction of the UE 115.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115. In some examples, a base station 105 may detect a transmission direction based on a receiving antenna, or an orientation of a receiving antenna or antenna array.

In some cases, wireless communications system 100 may be a packet-based network that operates according to a layered protocol stack. In the user plane, communications at the bearer or packet data convergence protocol (PDCP) layer may be IP-based. A radio link control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and a network device (e.g., base station 105-c, base station 105-b, or core network 130) supporting radio bearers for user plane data. At the Physical (PHY) layer, transport channels may be mapped to physical channels.

Figure 2:
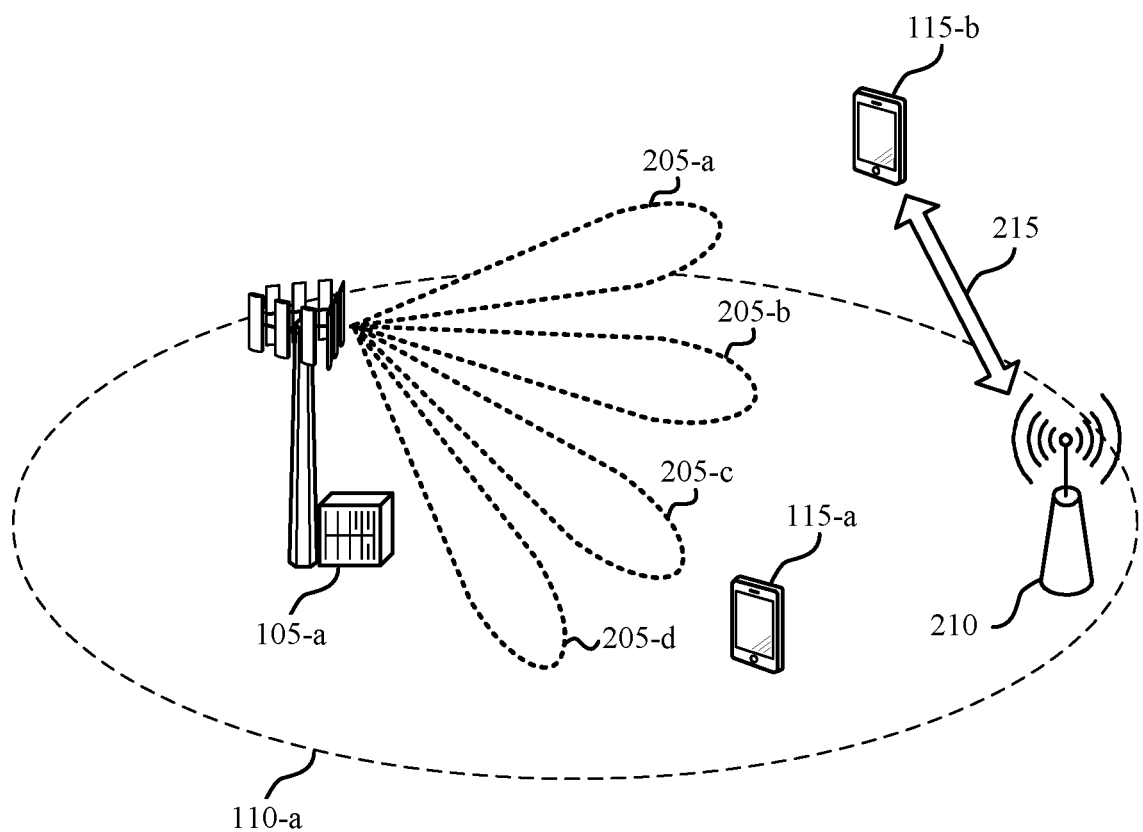
FIG. 2 illustrates an example of a wireless communications system that supports directional reception and periodic RTS/CTS transmission to estimate interference in accordance with aspects of the present disclosure.

FIG. 2 illustrates an example of a wireless communications system 200 that supports directional reception and periodic RTS/CTS transmission to estimate interference in accordance with aspects of the present disclosure. Wireless communications system 200 may include multiple UEs 115 (e.g., UE 115-a and UE 115-b), base stations 105 (e.g., base station 105-a), which may be examples of a UE 115 and base station 105 as described herein. Base station 105-a may transmit on an unlicensed or licensed radio frequency spectrum band, for example, by using one or more directional beams 205. In some examples, base station 105-a may transmit to UE 115-a using directional beam 205-c. In other examples, UE 115-a may have pending data and perform directional LBT procedures as described herein. Wireless device 210 may communicate with UE 115-b using communications link 215 on the unlicensed radio frequency spectrum band. Wireless device 210 may also transmit on the unlicensed radio frequency spectrum band. Wireless device 210 may be an example of a base station 105 or an access point.

Base station 105-a may determine a direction of at least one of UE 115-b or wireless device 210 based on RTS/CTS transmissions. That is, in some cases, base stations 105 and UEs 115 may transmit periodic training RTS/CTS signals. Base station 105-a may monitor for training RTS/CTS signals and periodically update directions to UEs 115 (including UE 115-a and UE 115-b) and other wireless devices (e.g., base stations 105 or wireless device 210). In some cases, a UE 115 and base station 105 may periodically transmit training RTS/CTS signals if the devices do not have pending data. Base station 105-a may use the periodic RTS/CTS training transmissions to determine a direction for UE 115-b and the wireless device 210, and accordingly determine a direction of communications link 215 based on the direction information.

In some examples, base station 105-a may use the direction information of UE 115-b and the wireless device 210 and perform a directional LBT procedure before transmitting to UE 115-a. For example, base station 105-a may use a directional LBT procedure to listen to the wireless device 210 (e.g., via directional beam 205-b). If base station 105-a detects an RTS/CTS signal from the wireless device 210 during the LBT period, base station 105-a may determine that the wireless device 210 is ready to transmit. Based on the directional information of UE 115-b and the wireless device 210, base station 105-a may determine a level of interference that transmitting may introduce to the communication between UE 115-b and the wireless device 210. The interference level may be based on the direction of UE 115-b and the direction of the wireless device 210. In some examples, base station 105-a may detect the RTS/CTS signal from the wireless device 210 while transmitting CTS to another device (e.g., UE 115-a).

Base station 105-a may then determine whether to transmit based on the determined interference level, a transmission direction (e.g., to UE 115-a), and a direction of UE 115-b. In some cases, the level of interference may be greater than a threshold, and base station 105-a may refrain from transmitting the RTS. In other cases, the level of interference may be less than the threshold, and base station 105-a may continue to transmit. In this way, base station 105-a may reduce unnecessary back offs if it detects a transmission in a different direction than the direction it is trying to transmit.

Figure 3:
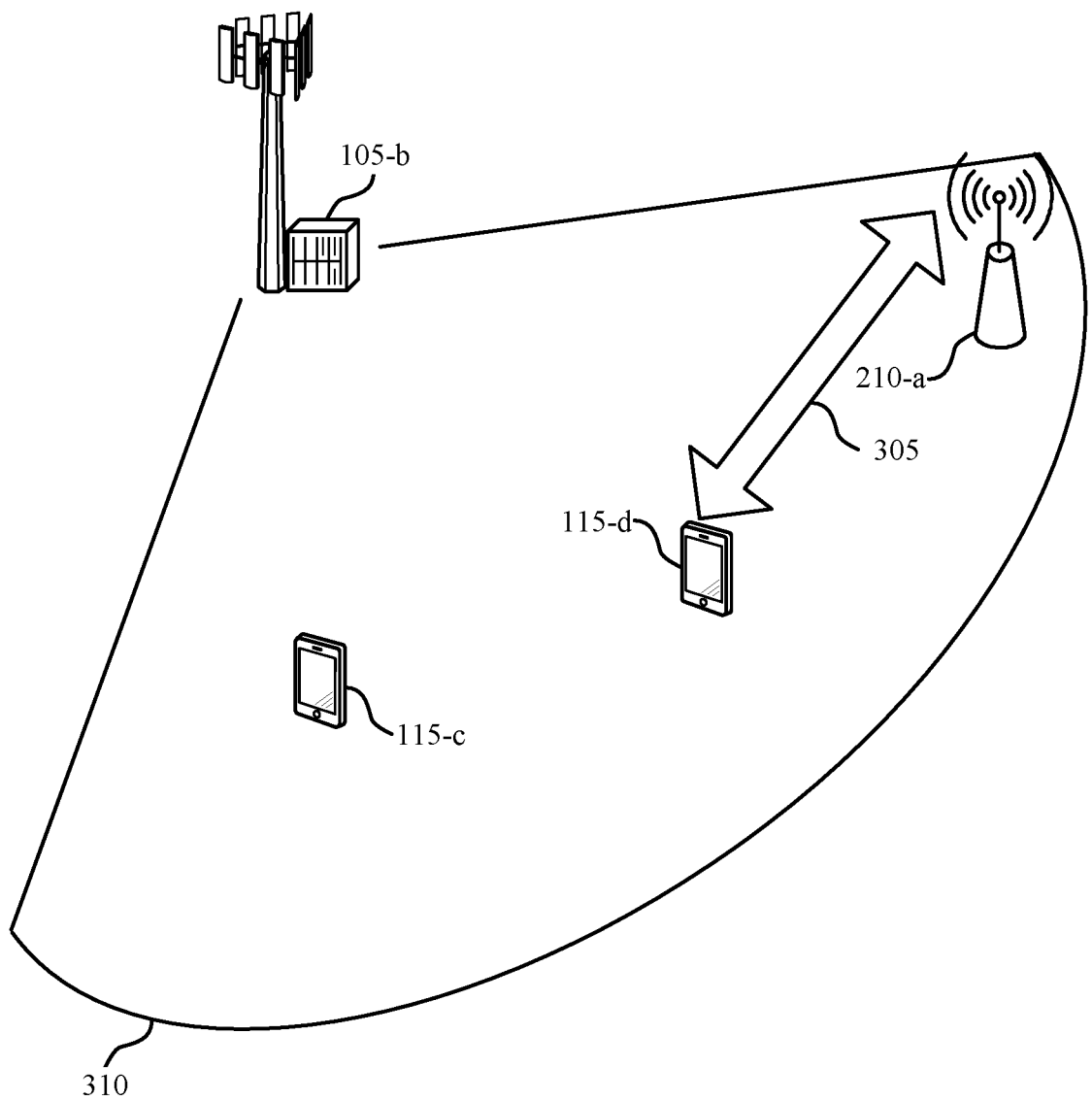
FIG. 3 illustrates an example of an omnidirectional listen-before-talk (LBT) sweep during an RTS/CTS training period that supports directional reception and periodic RTS/CTS transmission to estimate interference in accordance with aspects of the present disclosure.

FIG. 3 illustrates an example of an omnidirectional LBT sweep during an RTS/CTS training period 300 that supports directional reception and periodic RTS/CTS transmission to estimate interference in accordance with aspects of the present disclosure. Base station 105-b may scan for training RTS/CTS transmissions during an LBT period to determine directions of other devices. UE 115-c and UE 115-d may be examples of a UE 115, and base station 105-b and wireless device 210-a may be examples of a base station 105 or wireless device 210 as described with reference to FIGS. 1-2.

Base station 105-b may perform an LBT procedure across an omnidirectional coverage area 310 during an RTS/CTS training period. The omnidirectional coverage area 310 may cover a wide angle of transmission. Additionally or alternatively, base station 105-b may perform a directional LBT procedure in multiple directions within the omnidirectional coverage area 310. For example, base station 105-b may perform a directional LBT procedure toward wireless device 210-a and detect communication between UE 115-d and wireless device 210-a. UE 115-d and wireless device 210-a may transmit a training RTS/CTS signal. Base station 105-b may then detect the training RTS/CTS signal, and accordingly use the training RTS/CTS signal to determine a direction of UE 115-d and wireless device 210-a. Additionally or alternatively, base station 105-b may have previously determined a direction of UE 115-d and wireless device 210-a before detecting the training RTS/CTS signal, which may then be used to determine interference after receiving the training RTS/CTS signal. Base station 105-b may also determine that the other devices are communicating on communication link 305 based on the training RTS/CTS signals. Before transmitting to UE 115-c, base station 105-b may determine an interference that transmitting to UE 115-c would cause to UE 115-d based on the direction of UE 115-d and the direction of UE 115-c.

Figure 4:
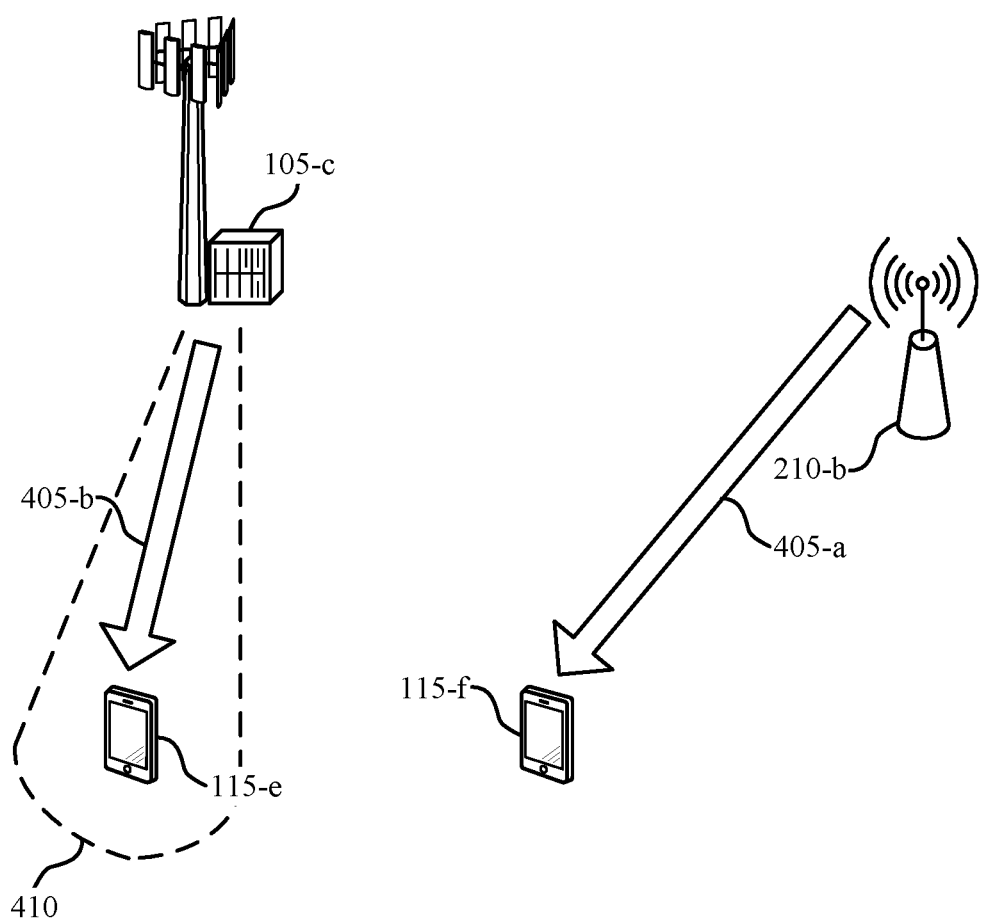
FIG. 4 illustrates an example of a directional LBT sweep that supports directional reception and periodic RTS/CTS transmission to estimate interference in accordance with aspects of the present disclosure.

FIG. 4 illustrates an example of a directional LBT procedure 400 for directional reception and periodic RTS/CTS transmission to estimate interference in accordance with aspects of the present disclosure. Base station 105-c may perform a directional LBT procedure to determine possible interference before transmitting to UE 115-e, as illustrated in FIGS. 1-3. UE 115-e and UE 115-f may be examples of a UE 115, and base station 105-c and wireless device 210-b may be examples of a base station 105 or wireless device 210 as described with reference to FIGS. 1-2. Base station 105-c may determine position information of wireless device 210-*b* and UE 115-*f* based on training RTS/CTS signals as described herein and as illustrated in FIG. 3.

Base station 105-*c* may prepare a transmission to UE 115-*e* using a directional beam 410. The base station 105-*c* may perform a directional LBT procedure in the direction of wireless device 210-*b* prior to transmitting. Base station 105-*c* may be checking for transmission between UE 115-*f* and wireless device 210-*b*. In some examples, the transmission medium may be available, and base station 105-*c* may transmit downlink information on communication link 405-*b* to UE 115-*e*.

However, if base station 105-*c* detects a transmission from wireless device 210-*b*, base station 105-*c* may determine a level of interference introduced by transmissions from base station 105-*c* to receipt of UE 115-*f* of a transmission from wireless device 210-*b*. In some examples, the transmission may be an RTS signal, which may indicate to base station 105-*c* that wireless device 210-*b* is to transmit to UE 115-*f*. In some examples, base station 105-*c* may detect the RTS signal while transmitting a CTS signal to UE 115-*e*. Base station 105-*c* may determine the interference level based on position information of UE 115-*f* and wireless device 210-*b*. In some examples, the position or direction information may be determined based on training RTS/CTS signals. In some examples, the position or direction information may have been determined previously before detecting the transmission from wireless device 210-*b*. If the interference level is above a threshold, base station 105-*c* may refrain from transmitting to UE 115-*e*. Otherwise, base station 105-*c* may continue to transmit to UE 115-*e*. For example, if UE 115-*f* were in a similar direction as UE 115-*e*, the interference level may be high. If the two UEs 115 are in different directions, the interference level may be low, and base station 105-*c* may not noticeably affect transmission of UE 115-*f*.

In some examples, UE 115-*f* and wireless device 210-*b* may communicate on communication link 405-*a* while base station 105-*c* performs a directional LBT toward wireless device 210-*b*. However, base station 105-*c* may determine that there would not be significant interference based on the location of UE 115-*f* and the direction of the directional beam 410. Therefore, the communication link 405-*b* between UE 115-*e* and base station 105-*c* may not affect transmissions between UE 115-*f* and wireless device 210-*b*, and base station 105-*c* may continue to transmit.

Figure 5:
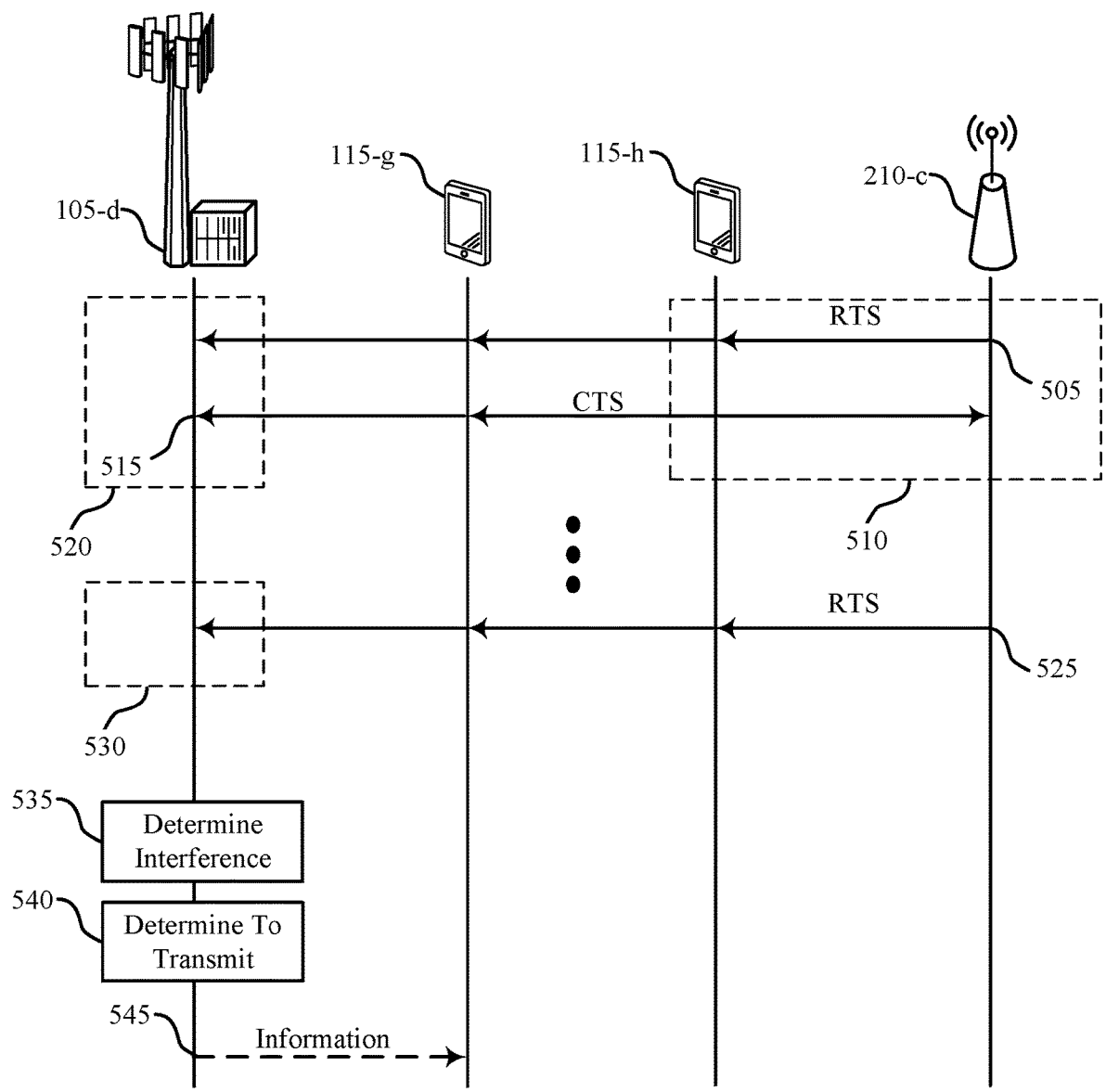
FIG. 5 illustrates an example of a process flow that supports directional reception and periodic RTS/CTS transmission to estimate interference in accordance with aspects of the present disclosure.

FIG. 5 illustrates an example of a process flow 500 for directional reception and periodic RTS/CTS transmission to estimate interference in accordance with aspects of the present disclosure. Base station 105-*d* may have a pending transmission for UE 115-*g* and begin an LBT procedure. During the LBT period, base station 105-*d* may receive a signal from wireless device 210-*c*. Base station 105-*d* may estimate that the signal from wireless device 210-*c* is intended for UE 115-*h*. Base station 105-*d* may determine whether to transmit to UE 115-*g* based on whether the transmission would introduce interference to UE 115-*h* and wireless device 210-*c*.

At 505, wireless device 210-*c* may transmit (e.g., broadcast) an RTS signal to surrounding devices. The RTS signal may indicate that wireless device 210-*c* is beginning to transmit to UE 115-*h*. Wireless device 210-*c* may not have data for UE 115-*h*, but it may still transmit the RTS signal. The RTS signal may be transmitted during training period 510, during which UE 115-*h* may transmit a CTS signals, which other transmitting devices may use to determine position information of other devices. Base station 105-*d* may determine position information for wireless device 210-*c* based on the RTS signal.

At 515, UE 115-*h* may transmit a CTS signal to surrounding devices in response to the RTS. Base station 105-*d* may determine position information for UE 115-*h* based on the CTS signal. The CTS signal may also be transmitted during the training period 510. The training period 510 may be at the same time as an LBT period 520 for base station 105-*d*. Thus, base station 105-*d* may monitor for the RTS/CTS signals during the LBT period 520.

At 525, wireless device 210-*c* may transmit an RTS signal to neighboring devices. The RTS signal may indicate that wireless device 210-*c* is preparing to transmit to UE 115-*h*. In some examples, base station 105-*d* may determine that wireless device 210—is preparing to transmit to UE 115-*h* based on the RTS signal transmitted at step 505. Base station 105-*d* may receive the transmission during an LBT period 530. The transmission may be received using an unlicensed radio frequency spectrum band, or a radio frequency spectrum band used by licensed and unlicensed networks.

At 535, base station 105-*d* may determine a level of interference that transmitting would cause to UE 115-*h*. The level of interference may be estimated based on the direction of UE 115-*h*. The direction of UE 115-*h* may be determined based on the RTS/CTS signals transmitted at 505 and 515. In some examples, base station 105-*d* may transmit to UE 115-*g* using a directional transmission having a beam direction, and the level of interference may be determined based on the beam direction.

At 540, base station 105-*d* may determine whether to transmit to UE 115-*g*. Base station 105-*d* may determine whether to transmit based on the interference level, the direction of UE 115-*h*, and the first transmission (e.g., the RTS received at 525). For example, if the interference level is below a threshold, base station 105-*d* may transmit to UE 115-*g*. If the interference level is above the threshold, base station 105-*d* may refrain from transmitting to UE 115-*h*.

At 545, base station 105-*d* may transmit to UE 115-*g*. Base station 105-*d* may select a transmission power for transmitting based on a direction of the transmission and a direction of UE 115-*h*.

Figure 6:
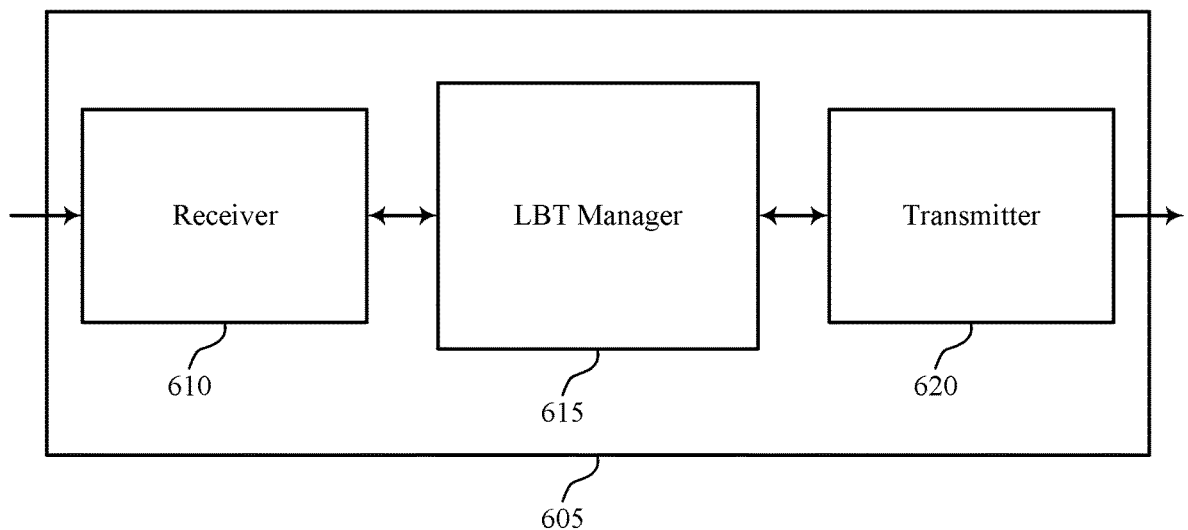
FIGS. 6 through 8 show block diagrams of wireless devices that support directional reception and periodic RTS/CTS transmission to estimate interference in accordance with aspects of the present disclosure.

FIG. 6 shows a block diagram 600 of a wireless device 605 that supports directional reception and periodic RTS/CTS transmission to estimate interference in accordance with aspects of the present disclosure. Wireless device 605 may be an example of aspects of a UE 115 or base station 105 as described with reference to FIG. 1. Wireless device 605 may include receiver 610, LBT manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to directional reception and periodic RTS/CTS transmission to estimate interference, etc.). Information may be passed on to other components of the device. The receiver 610 may be an example of aspects of the transceiver 935 as described with reference to FIG. 9.

Receiver 610 may receive a first transmission from a first wireless device and receive a measurement report. In some cases, the first transmission from the first wireless device is received using an unlicensed radio frequency spectrum band. In some cases, the first transmission from the first wireless device is received using a radio frequency spectrum band used by licensed and unlicensed networks. In some cases, the first transmission includes an RTS or CTS message.

LBT manager 615 may be an example of aspects of the LBT manager 915 as described with reference to FIG. 9.

LBT manager 615 and/or at least some of its various sub-components may be implemented in hardware, software executed by a processor, firmware, or any combination thereof. If implemented in software executed by a processor, the functions of the LBT manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The LBT manager 615 and/or at least some of its various sub-components may be physically located at various positions, including being distributed such that portions of functions are implemented at different physical locations by one or more physical devices. In some examples, LBT manager 615 and/or at least some of its various sub-components may be a separate and distinct component in accordance with various aspects of the present disclosure. In other examples, LBT manager 615 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

LBT manager 615 may identify a direction of a second wireless device, estimate an interference level that would be imposed by a second transmission at the second wireless device, and determine whether to transmit the second transmission based on the estimated interference level, the first transmission, and the direction of the second wireless device.

Transmitter 620 may transmit signals generated by other components of the device. In some examples, the transmitter 620 may be collocated with a receiver 610 in a transceiver module. For example, the transmitter 620 may be an example of aspects of the transceiver 935 as described with reference to FIG. 9. The transmitter 620 may include a single antenna, or it may include a set of antennas.

Figure 7:
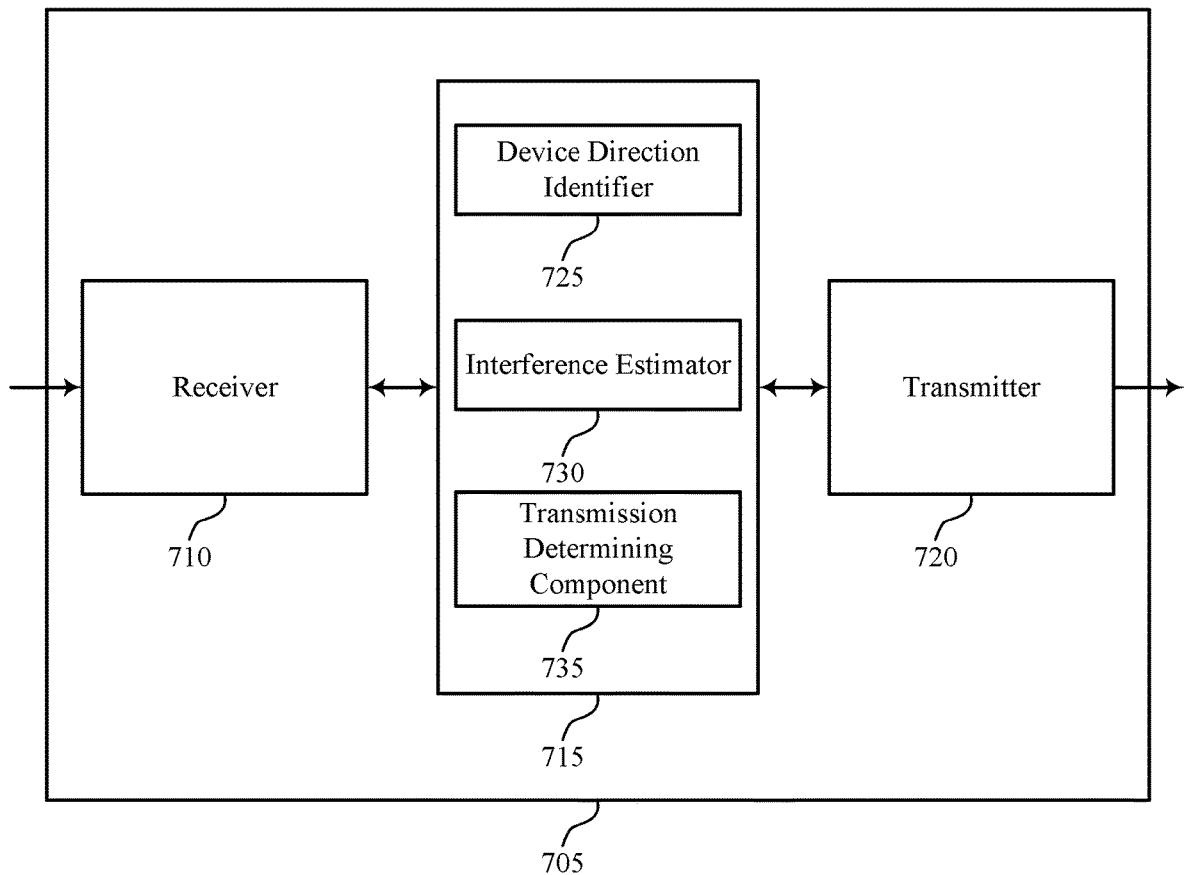

FIG. 7 shows a block diagram 700 of a wireless device 705 that supports directional reception and periodic RTS/CTS transmission to estimate interference in accordance with aspects of the present disclosure. Wireless device 705 may be an example of aspects of a wireless device 605 or a UE 115 or base station 105 as described with reference to FIGS. 1 and 6. Wireless device 705 may include receiver 710, LBT manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to directional reception and periodic RTS/CTS transmission to estimate interference, etc.). Information may be passed on to other components of the device. The receiver 710 may be an example of aspects of the transceiver 935 as described with reference to FIG. 9.

LBT manager 715 may be an example of aspects of the LBT manager 915 as described with reference to FIG. 9.

LBT manager 715 may also include device direction identifier 725, interference estimator 730, and transmission determining component 735.

Device direction identifier 725 may monitor one or more receiving directions, where the direction of the second wireless device is identified based on the monitoring, and the interference level is estimated based on the direction of the second wireless device. Device direction identifier 725 may receive an RTS or CTS training signal from the second wireless device, where the direction of the second wireless device may be based on receiving the RTS or CTS training signal. Device direction identifier 725 may identify a direction of a second wireless device, and select a transmission power for transmitting the second transmission based on a direction of the second transmission and the direction of the second wireless device.

Interference estimator 730 may estimate an interference level that would be imposed by a second transmission at the second wireless device, determine that the interference level is below a threshold, and determine that the interference level is above a threshold. In some cases, the interference level is estimated based on a direction of the second transmission, the direction of the second wireless device, the first transmission, or any combination thereof.

Transmission determining component 735 may determine whether to transmit the second transmission based on the estimated interference level, the first transmission, and the direction of the second wireless device, transmit the second transmission based on the determination, and refrain from transmitting the second transmission based on the determination. In some cases, the second transmission includes a directional transmission having a beam direction, where the determination to transmit the second transmission is based on the beam direction.

Transmitter 720 may transmit signals generated by other components of the device. In some examples, the transmitter 720 may be collocated with a receiver 710 in a transceiver module. For example, the transmitter 720 may be an example of aspects of the transceiver 935 as described with reference to FIG. 9. The transmitter 720 may include a single antenna, or it may include a set of antennas.

Figure 8:
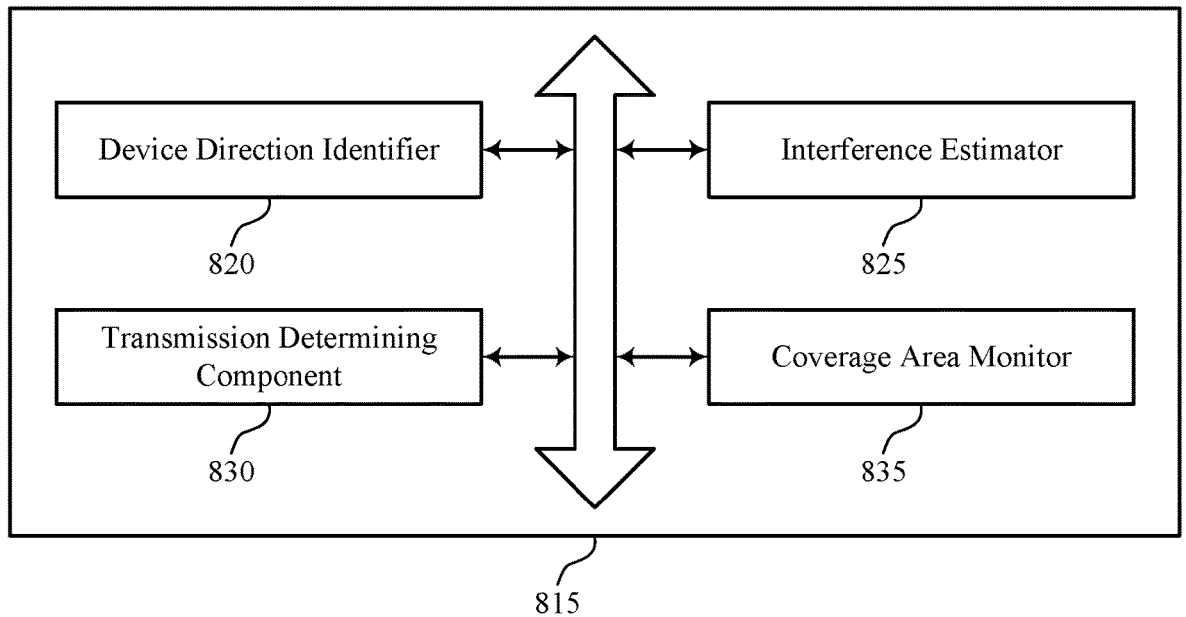

FIG. 8 shows a block diagram 800 of a LBT manager 815 that supports directional reception and periodic RTS/CTS transmission to estimate interference in accordance with aspects of the present disclosure. The LBT manager 815 may be an example of aspects of a LBT manager 615, a LBT manager 715, or a LBT manager 915 as described with reference to FIGS. 6, 7, and 9. The LBT manager 815 may include device direction identifier 820, interference estimator 825, transmission determining component 830, and coverage area monitor 835. Each of these modules may communicate, directly or indirectly, with one another (e.g., via one or more buses).

Device direction identifier 820 may monitor one or more receiving directions, where the direction of the second wireless device is identified based on the monitoring, and the interference level is estimated based on the direction of the second wireless device, receive an RTS or CTS training signal from the second wireless device, where the direction of the second wireless device is based on receiving the RTS or CTS training signal, identify a direction of a second wireless device, and select a transmission power for transmitting the second transmission based on a direction of the second transmission and the direction of the second wireless device.

Interference estimator 825 may estimate an interference level that would be imposed by a second transmission at the second wireless device, determine that the interference level is below a threshold, and determine that the interference level is above a threshold. In some cases, the interference level is estimated based on a direction of the second transmission, the direction of the second wireless device, the first transmission, or any combination thereof.

Transmission determining component 830 may determine whether to transmit the second transmission based on the estimated interference level, the first transmission, and the direction of the second wireless device, transmit the second transmission based on the determination, and refrain from transmitting the second transmission based on the determination. In some cases, the second transmission includes a directional transmission having a beam direction, where the determination to transmit the second transmission is based on the beam direction.

Coverage area monitor 835 may monitor a set of directions across an angular coverage area according to a sweeping pattern, select the set of directions based on a range of a calibration error, a lack of downlink/uplink beam correspondence, information received from a network entity, a collision history, or any combination thereof, determine a receiving beam direction, and determine the downlink/uplink beam correspondence based on the reception beam direction. In some cases, the set of directions includes a subset of the directions within the angular coverage area.

Figure 9:
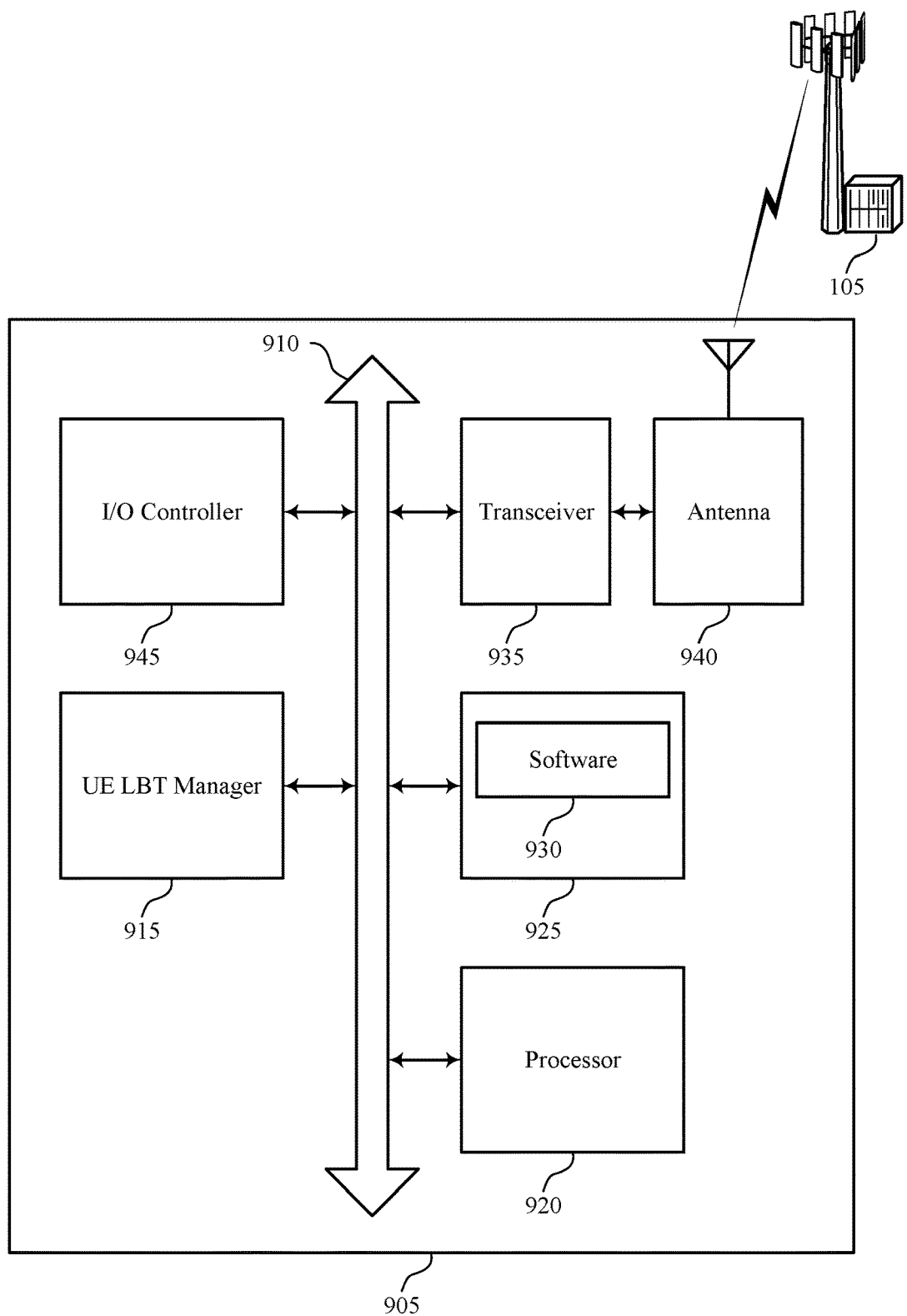
FIG. 9 illustrates a block diagram of a system including a device that supports directional reception and periodic RTS/CTS transmission to estimate interference in accordance with aspects of the present disclosure.

FIG. 9 illustrates a block diagram of a system 900 including a device 905 that supports directional reception and periodic RTS/CTS transmission to estimate interference in accordance with aspects of the present disclosure. Device 905 may be an example of or include the components of wireless device 605, wireless device 705, or a UE 115 as described with reference to, e.g., FIGS. 1, 6 and 7. Device 905 may include components for bi-directional voice and data communications including components for transmitting and receiving communications, including LBT manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting directional reception and periodic RTS/CTS transmission to estimate interference).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support directional reception and periodic RTS/CTS transmission to estimate interference. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
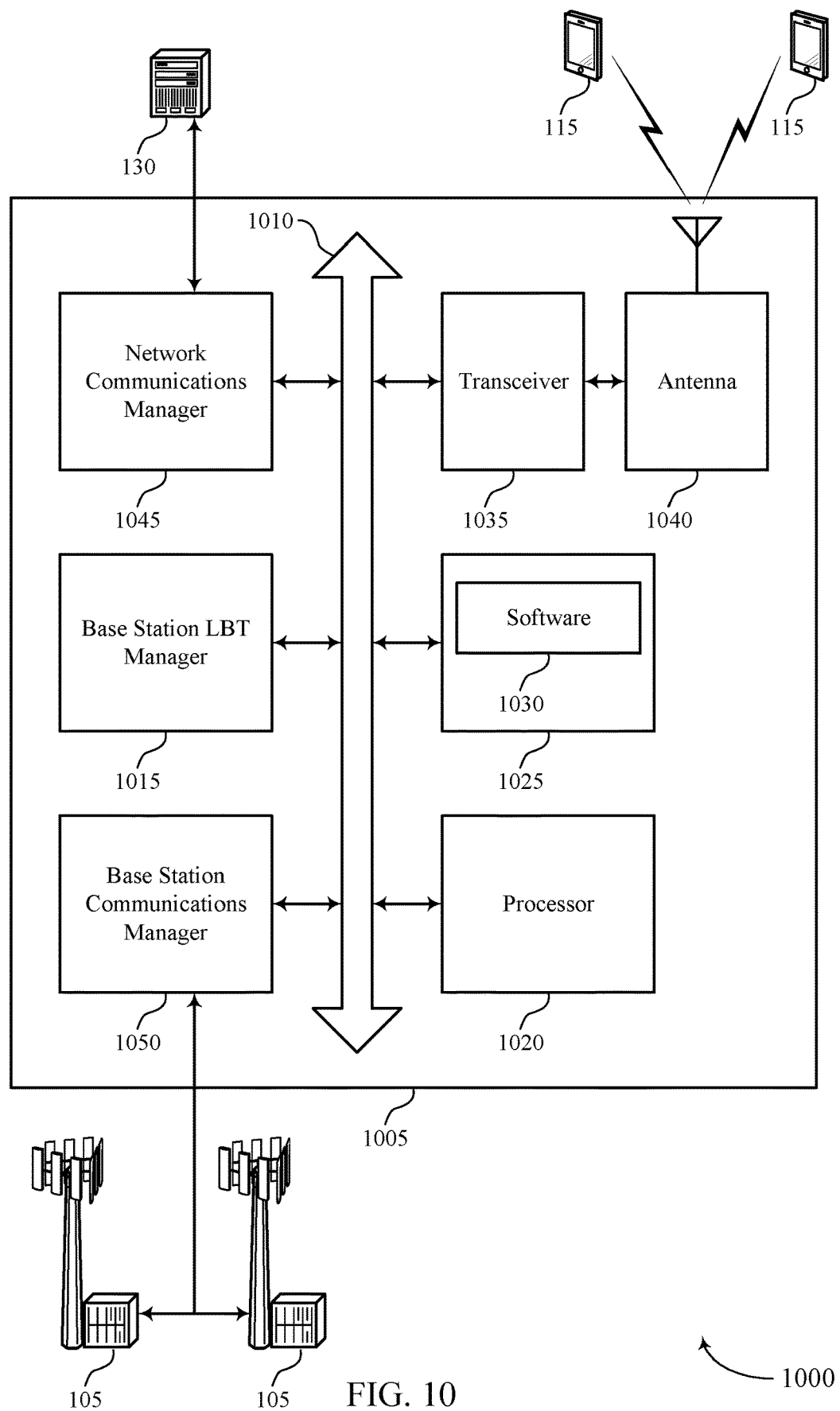
FIG. 10 illustrates a block diagram of a system including a device that supports directional reception and periodic RTS/CTS transmission to estimate interference in accordance with aspects of the present disclosure.

FIG. 10 shows a diagram of a system 1000 including a device 1005 that supports directional reception and periodic RTS/CTS transmission to estimate interference in accordance with aspects of the present disclosure. In some examples, the directional reception may be during LBT. Device 1005 may be an example of or include the components of wireless device 705, wireless device 805, or a base station 105 as described with reference to, e.g., FIGS. 1, 7 and 8. Device 1005 may include components for bi-directional voice and data communications including components for transmitting and receiving communications, including base station LBT manager 1015, processor 1020, memory 1025, software 1030, transceiver 1035, antenna 1040, network communications manager 1045, and base station communications manager 1050. These components may be in electronic communication via one or more busses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting directional reception and periodic RTS/CTS transmission to estimate interference).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware and/or software operation such as the interaction with peripheral components or devices.

Software 1030 may include code to implement aspects of the present disclosure, including code to support directional reception and periodic RTS/CTS transmission to estimate interference. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Base station communications manager 1050 may manage communications with other base station 105, and may include a controller or scheduler for controlling communications with UEs 115 in cooperation with other base stations 105. For example, the base station communications manager 1050 may coordinate scheduling for transmissions to UEs 115 for various interference mitigation techniques such as beamforming or joint transmission. In some examples, base station communications manager 1050 may provide an X2 interface within an LTE/LTE-A wireless communication network technology to provide communication between base stations 105.

Figure 11:
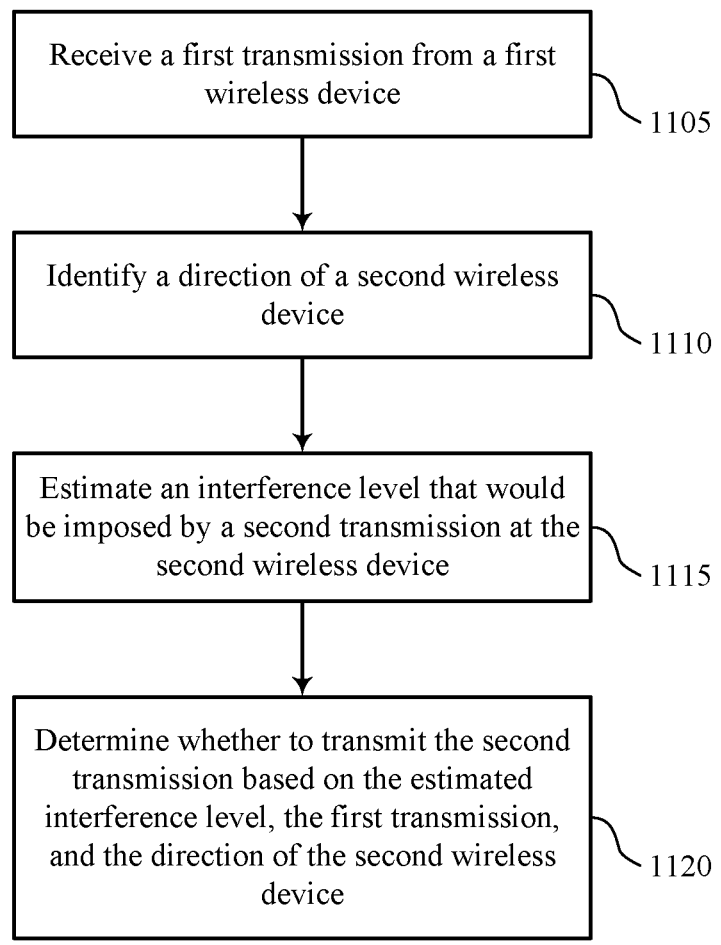
FIGS. 11 through 16 show flowcharts illustrating methods for directional reception and periodic RTS/CTS transmission to estimate interference in accordance with aspects of the present disclosure.

FIG. 11 shows a flowchart illustrating a method 1100 for directional reception and periodic RTS/CTS transmission to estimate interference in accordance with aspects of the present disclosure. In some examples, the directional reception may be during LBT. The operations of method 1100 may be implemented by a UE 115 or base station 105 or its components as described herein. For example, the operations of method 1100 may be performed by a LBT manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1105 the UE 115 or base station 105 may receive a first transmission from a first wireless device. In some examples, the UE 115 or base station 105 may receive the first transmission during an LBT period. The operations of block 1105 may be performed according to the methods as described with reference to FIGS. 1 through 5. In certain examples, aspects of the operations of block 1105 may be performed by a receiver as described with reference to FIGS. 6 through 8.

At block 1110 the UE 115 or base station 105 may identify a direction of a second wireless device. In some examples, base station 105 may identify the direction of the second wireless device before receiving the first transmission at block 1105. That is, the identification may be based on a previous identification of a direction, for example, from a previous RTS/CTS training sequence. The operations of block 1110 may be performed according to the methods as described with reference to FIGS. 1 through 5. In certain examples, aspects of the operations of block 1110 may be performed by a device direction identifier as described with reference to FIGS. 6 through 8.

At block 1115 the UE 115 or base station 105 may estimate an interference level that would be imposed by a second transmission at the second wireless device. The operations of block 1115 may be performed according to the methods as described with reference to FIGS. 1 through 5. In certain examples, aspects of the operations of block 1115 may be performed by an interference estimator as described with reference to FIGS. 6 through 8.

At block 1120 the UE 115 or base station 105 may determine whether to transmit the second transmission based at least in part on the estimated interference level, the first transmission, and the direction of the second wireless device. The operations of block 1120 may be performed according to the methods as described with reference to FIGS. 1 through 5. In certain examples, aspects of the operations of block 1120 may be performed by a transmission determining component as described with reference to FIGS. 6 through 8.

Figure 12:
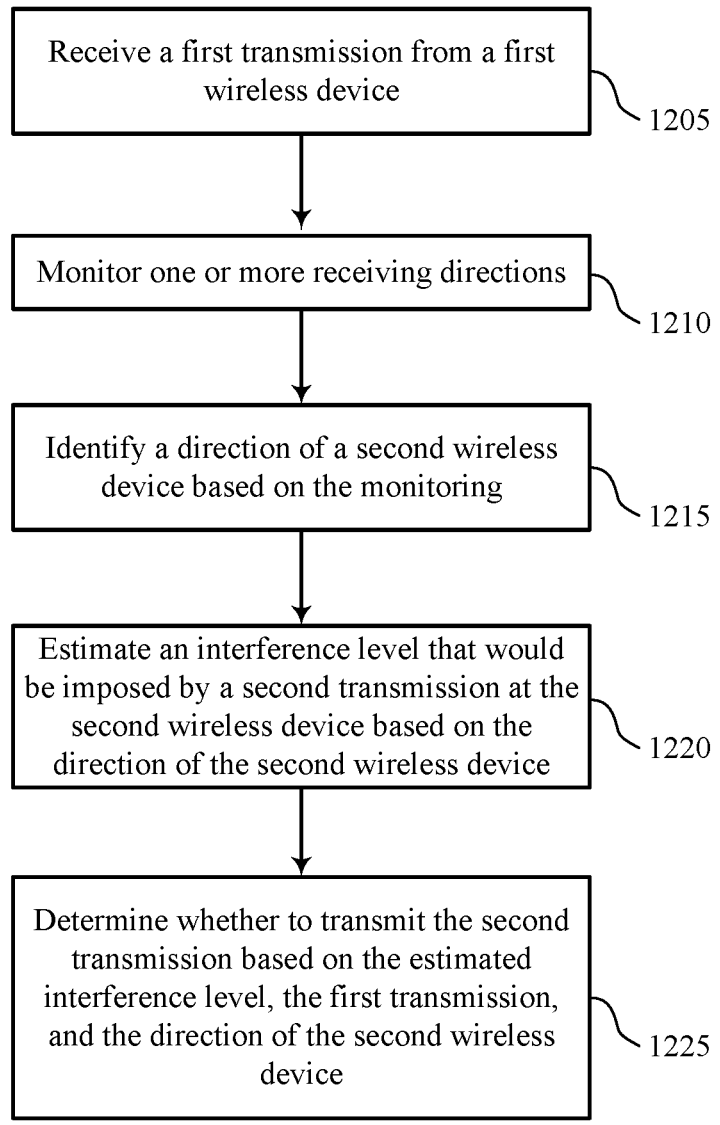

FIG. 12 shows a flowchart illustrating a method 1200 for directional reception and periodic RTS/CTS transmission to estimate interference in accordance with aspects of the present disclosure. In some examples, the directional reception may be during LBT. The operations of method 1200 may be implemented by a UE 115 or base station 105 or its components as described herein. For example, the operations of method 1200 may be performed by a LBT manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205 the UE 115 or base station 105 may receive a first transmission from a first wireless device. In some examples, the UE 115 or base station 105 may receive the first transmission during an LBT period. The operations of block 1205 may be performed according to the methods as described with reference to FIGS. 1 through 5. In certain examples, aspects of the operations of block 1205 may be performed by a receiver as described with reference to FIGS. 6 through 8.

At block 1210 the UE 115 or base station 105 may monitor one or more receiving directions, wherein the direction of the second wireless device is identified based at least in part on the monitoring, and the interference level is estimated based at least in part on the direction of the second wireless device. The operations of block 1210 may be performed according to the methods as described with reference to FIGS. 1 through 5. In certain examples, aspects of the operations of block 1210 may be performed by a device direction identifier as described with reference to FIGS. 6 through 8.

At block 1215 the UE 115 or base station 105 may identify a direction of a second wireless device. The operations of block 1215 may be performed according to the methods as described with reference to FIGS. 1 through 5. In certain examples, aspects of the operations of block 1215 may be performed by a device direction identifier as described with reference to FIGS. 6 through 8.

At block 1220 the UE 115 or base station 105 may estimate an interference level that would be imposed by a second transmission at the second wireless device. The operations of block 1220 may be performed according to the methods as described with reference to FIGS. 1 through 5. In certain examples, aspects of the operations of block 1220 may be performed by an interference estimator as described with reference to FIGS. 6 through 8.

At block 1225 the UE 115 or base station 105 may determine whether to transmit the second transmission based at least in part on the estimated interference level, the first transmission, and the direction of the second wireless device. The operations of block 1225 may be performed according to the methods as described with reference to FIGS. 1 through 5. In certain examples, aspects of the operations of block 1225 may be performed by a transmission determining component as described with reference to FIGS. 6 through 8.

Figure 13:
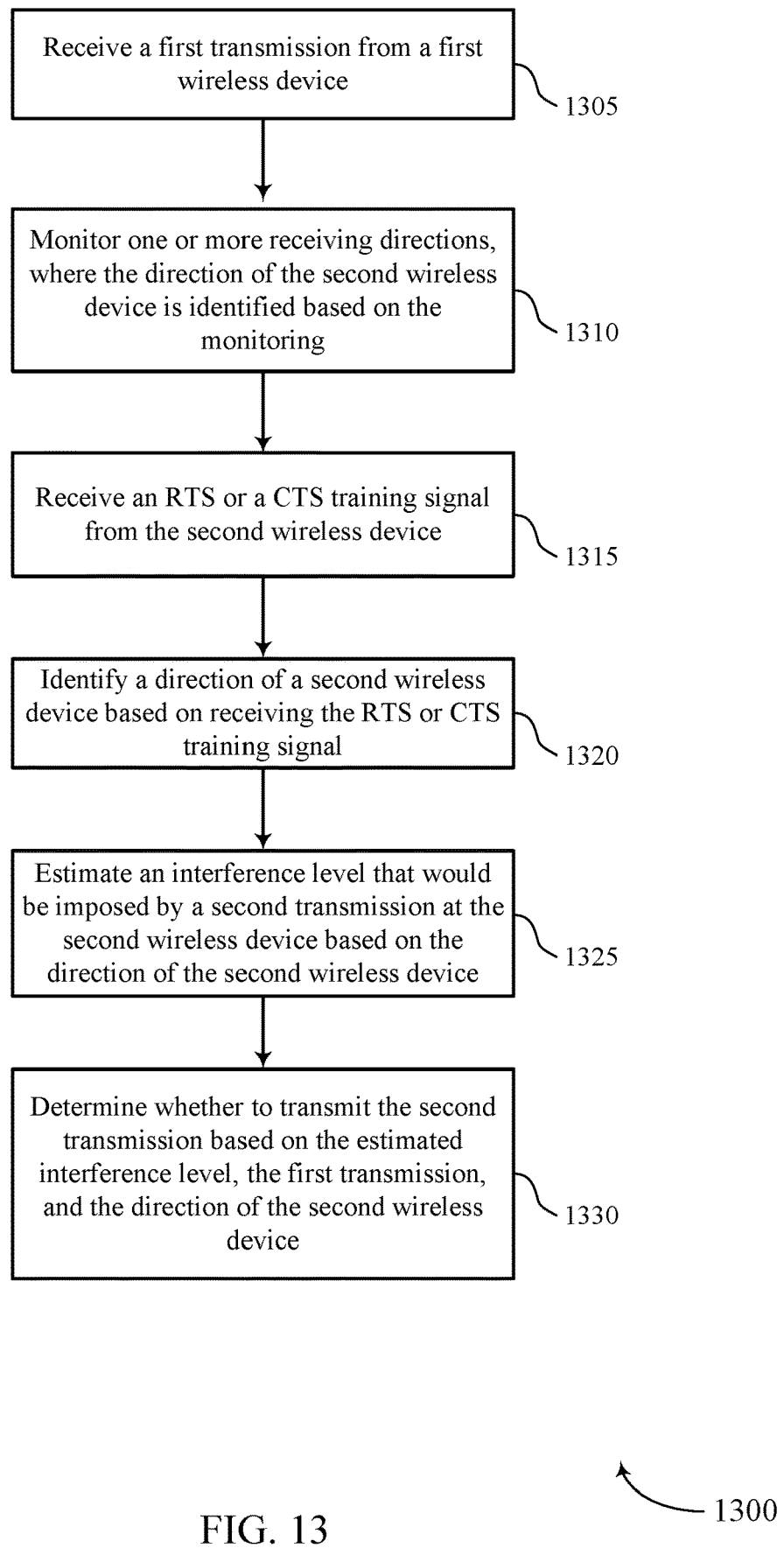

FIG. 13 shows a flowchart illustrating a method 1300 for directional reception and periodic RTS/CTS transmission to estimate interference in accordance with aspects of the present disclosure. In some examples, the directional reception may be during LBT. The operations of method 1300 may be implemented by a UE 115 or base station 105 or its components as described herein. For example, the operations of method 1300 may be performed by a LBT manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may receive a first transmission from a first wireless device. In some examples, the UE 115 or base station 105 may receive the first transmission during an LBT period. The operations of block 1305 may be performed according to the methods as described with reference to FIGS. 1 through 5. In certain examples, aspects of the operations of block 1305 may be performed by a receiver as described with reference to FIGS. 6 through 8.

At block 1310 the UE 115 or base station 105 may monitor one or more receiving directions, wherein the direction of the second wireless device is identified based at least in part on the monitoring, and the interference level is estimated based at least in part on the direction of the second wireless device. The operations of block 1310 may be performed according to the methods described with reference to FIGS. 1 through 5. In certain examples, aspects of the operations of block 1310 may be performed by a device direction identifier as described with reference to FIGS. 6 through 8.

At block 1315 the UE 115 or base station 105 may receive an RTS or CTS training signal from the second wireless device, wherein the direction of the second wireless device is based at least in part on receiving the RTS or CTS training signal. The operations of block 1315 may be performed according to the methods as described with reference to FIGS. 1 through 5. In certain examples, aspects of the operations of block 1315 may be performed by a device direction identifier as described with reference to FIGS. 6 through 8.

At block 1320 the UE 115 or base station 105 may identify a direction of a second wireless device. The operations of block 1320 may be performed according to the methods described with reference to FIGS. 1 through 5. In certain examples, aspects of the operations of block 1320 may be performed by a device direction identifier as described with reference to FIGS. 6 through 8.

At block 1325 the UE 115 or base station 105 may estimate an interference level that would be imposed by a second transmission at the second wireless device. The operations of block 1325 may be performed according to the methods as described with reference to FIGS. 1 through 5. In certain examples, aspects of the operations of block 1325 may be performed by an interference estimator as described with reference to FIGS. 6 through 8.

At block 1330 the UE 115 or base station 105 may determine whether to transmit the second transmission based at least in part on the estimated interference level, the first transmission, and the direction of the second wireless device. The operations of block 1330 may be performed according to the methods described with reference to FIGS. 1 through 5. In certain examples, aspects of the operations of block 1330 may be performed by a transmission determining component as described with reference to FIGS. 6 through 8.

Figure 14:
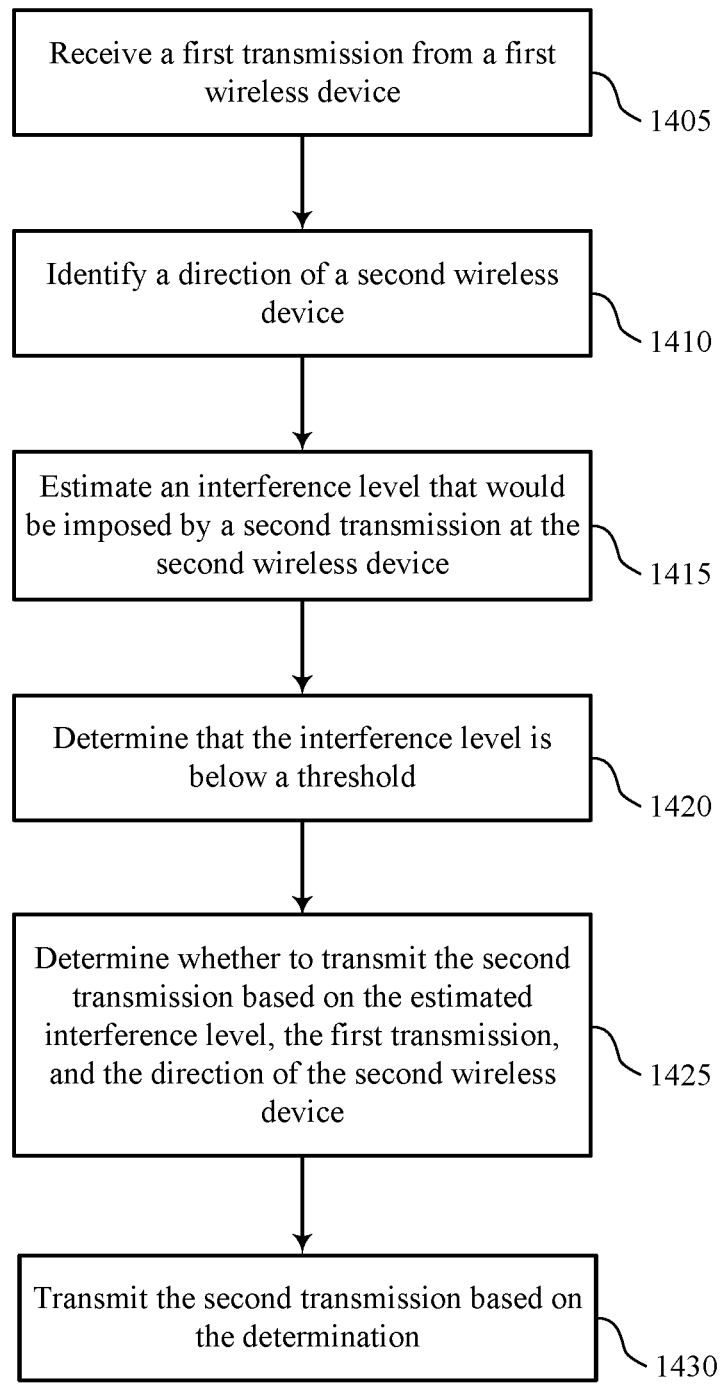

FIG. 14 shows a flowchart illustrating a method 1400 for directional reception and periodic RTS/CTS transmission to estimate interference in accordance with aspects of the present disclosure. In some examples, the directional reception may be during LBT. The operations of method 1400 may be implemented by a UE 115 or base station 105 or its components as described herein. For example, the operations of method 1400 may be performed by a LBT manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1405 the UE 115 or base station 105 may receive a first transmission from a first wireless device. In some examples, the UE 115 or base station 105 may receive the first transmission during an LBT period. The operations of block 1405 may be performed according to the methods as described with reference to FIGS. 1 through 5. In certain examples, aspects of the operations of block 1405 may be performed by a receiver as described with reference to FIGS. 6 through 8.

At block 1410 the UE 115 or base station 105 may identify a direction of a second wireless device. The operations of block 1410 may be performed according to the methods as described with reference to FIGS. 1 through 5. In certain examples, aspects of the operations of block 1410 may be performed by a device direction identifier as described with reference to FIGS. 6 through 8.

At block 1415 the UE 115 or base station 105 may estimate an interference level that would be imposed by a second transmission at the second wireless device. The operations of block 1415 may be performed according to the methods as described with reference to FIGS. 1 through 5. In certain examples, aspects of the operations of block 1415 may be performed by an interference estimator as described with reference to FIGS. 6 through 8.

At block 1420 the UE 115 or base station 105 may determine that the interference level is below a threshold. The operations of block 1420 may be performed according to the methods as described with reference to FIGS. 1 through 5. In certain examples, aspects of the operations of block 1420 may be performed by an interference estimator as described with reference to FIGS. 6 through 8.

At block 1425 the UE 115 or base station 105 may determine whether to transmit the second transmission based at least in part on the estimated interference level, the first transmission, and the direction of the second wireless device. The operations of block 1425 may be performed according to the methods as described with reference to FIGS. 1 through 5. In certain examples, aspects of the operations of block 1425 may be performed by a transmission determining component as described with reference to FIGS. 6 through 8.

At block 1430 the UE 115 or base station 105 may transmit the second transmission based at least in part on the determination. The operations of block 1430 may be performed according to the methods as described with reference to FIGS. 1 through 5. In certain examples, aspects of the operations of block 1430 may be performed by a transmission determining component as described with reference to FIGS. 6 through 8.

Figure 15:
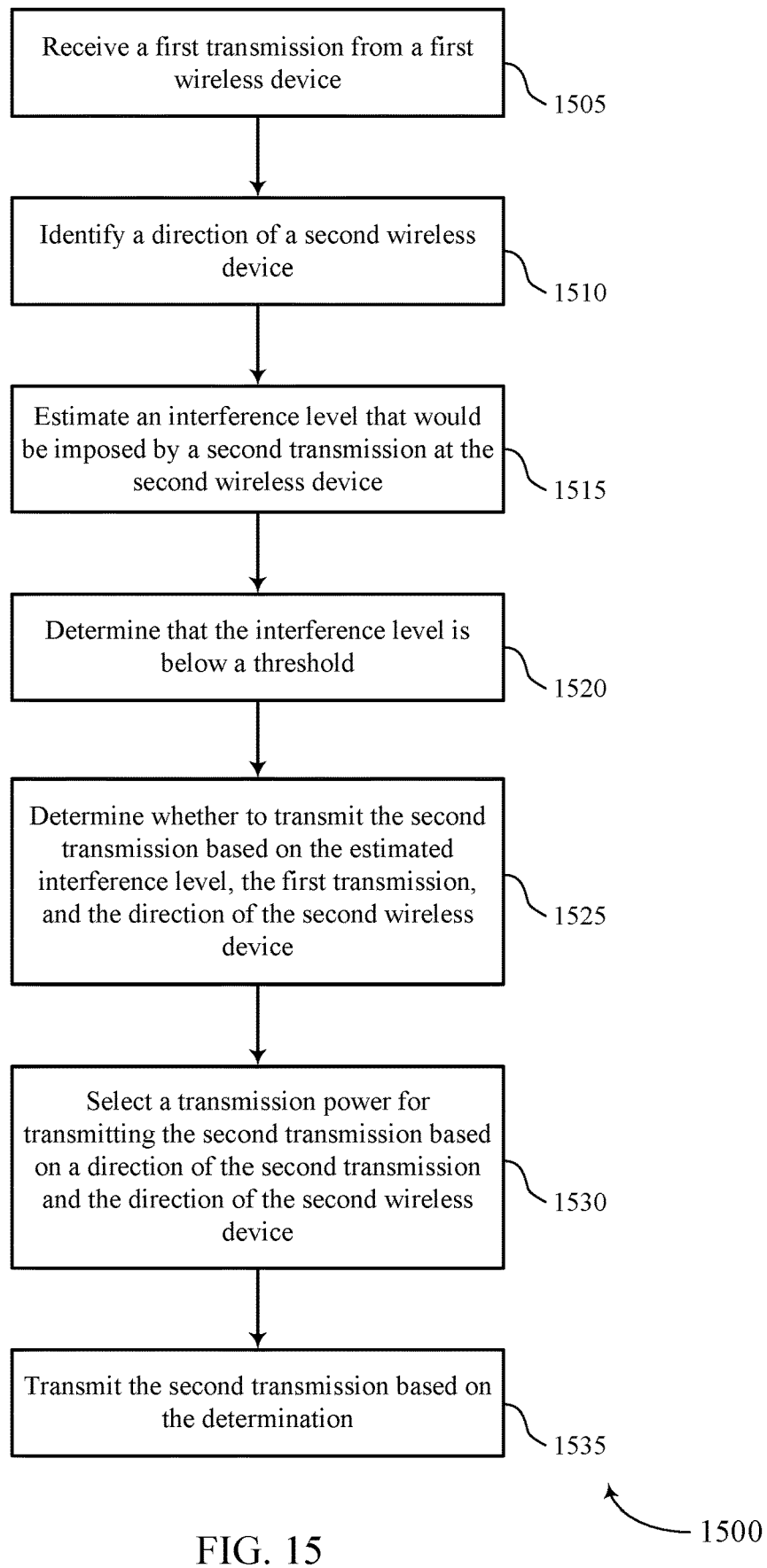

FIG. 15 shows a flowchart illustrating a method 1500 for directional reception and periodic RTS/CTS transmission to estimate interference in accordance with aspects of the present disclosure. The operations of method 1500 may be implemented by a UE 115 or base station 105 or its components as described herein. For example, the operations of method 1500 may be performed by a LBT manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1505 the UE 115 or base station 105 may receive a first transmission from a first wireless device. The operations of block 1505 may be performed according to the methods as described with reference to FIGS. 1 through 5. In certain examples, aspects of the operations of block 1505 may be performed by a receiver as described with reference to FIGS. 6 through 8.

At block 1510 the UE 115 or base station 105 may identify a direction of a second wireless device. The operations of block 1510 may be performed according to the methods as described with reference to FIGS. 1 through 5. In certain examples, aspects of the operations of block 1510 may be performed by a device direction identifier as described with reference to FIGS. 6 through 8.

At block 1515 the UE 115 or base station 105 may estimate an interference level that would be imposed by a second transmission at the second wireless device. The operations of block 1515 may be performed according to the methods as described with reference to FIGS. 1 through 5. In certain examples, aspects of the operations of block 1515 may be performed by an interference estimator as described with reference to FIGS. 6 through 8.

At block 1520 the UE 115 or base station 105 may determine that the interference level is below a threshold. The operations of block 1520 may be performed according to the methods as described with reference to FIGS. 1 through 5. In certain examples, aspects of the operations of block 1520 may be performed by an interference estimator as described with reference to FIGS. 6 through 8.

At block 1525 the UE 115 or base station 105 may transmit the second transmission based at least in part on the determination. The operations of block 1525 may be performed according to the methods as described with reference to FIGS. 1 through 5. In certain examples, aspects of the operations of block 1525 may be performed by a transmission determining component as described with reference to FIGS. 6 through 8.

At block 1530 the UE 115 or base station 105 may determine whether to transmit the second transmission based at least in part on the estimated interference level, the first transmission, and the direction of the second wireless device. The operations of block 1530 may be performed according to the methods as described with reference to FIGS. 1 through 5. In certain examples, aspects of the operations of block 1530 may be performed by a transmission determining component as described with reference to FIGS. 6 through 8.

At block 1535 the UE 115 or base station 105 may select a transmission power for transmitting the second transmission based at least in part on a direction of the second transmission and the direction of the second wireless device. The operations of block 1535 may be performed according to the methods as described with reference to FIGS. 1 through 5. In certain examples, aspects of the operations of block 1535 may be performed by a device direction identifier as described with reference to FIGS. 6 through 8.

Figure 16:
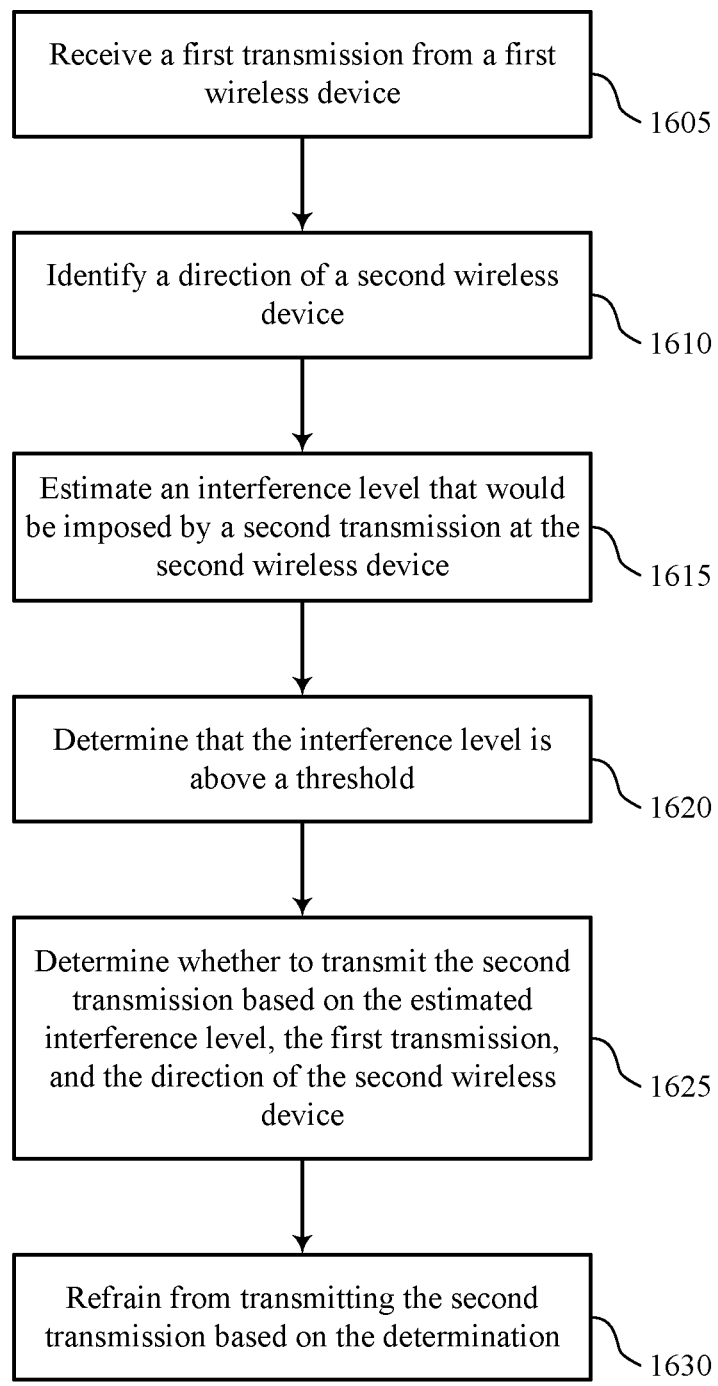

FIG. 16 shows a flowchart illustrating a method 1600 for directional reception and periodic RTS/CTS transmission to estimate interference in accordance with aspects of the present disclosure. In some examples, the directional reception may be during LBT. The operations of method 1600 may be implemented by a UE 115 or base station 105 or its components as described herein. For example, the operations of method 1600 may be performed by a LBT manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1605 the UE 115 or base station 105 may receive a first transmission from a first wireless device. The operations of block 1605 may be performed according to the methods as described with reference to FIGS. 1 through 5. In certain examples, aspects of the operations of block 1605 may be performed by a receiver as described with reference to FIGS. 6 through 8.

At block 1610 the UE 115 or base station 105 may identify a direction of a second wireless device. The operations of block 1610 may be performed according to the methods described with reference to FIGS. 1 through 5. In certain examples, aspects of the operations of block 1610 may be performed by a device direction identifier as described with reference to FIGS. 6 through 8.

At block 1615 the UE 115 or base station 105 may estimate an interference level that would be imposed by a second transmission at the second wireless device. The operations of block 1615 may be performed according to the methods as described with reference to FIGS. 1 through 5. In certain examples, aspects of the operations of block 1615 may be performed by an interference estimator as described with reference to FIGS. 6 through 8.

At block 1620 the UE 115 or base station 105 may determine that the interference level is above a threshold. The operations of block 1620 may be performed according to the methods as described with reference to FIGS. 1 through 5. In certain examples, aspects of the operations of block 1620 may be performed by an interference estimator as described with reference to FIGS. 6 through 8.

At block 1625 the UE 115 or base station 105 may determine whether to transmit the second transmission based at least in part on the estimated interference level, the first transmission, and the direction of the second wireless device. The operations of block 1625 may be performed according to the methods as described with reference to FIGS. 1 through 5. In certain examples, aspects of the operations of block 1625 may be performed by a transmission determining component as described with reference to FIGS. 6 through 8.

At block 1630 the UE 115 or base station 105 may refrain from transmitting the second transmission based at least in part on the determination. The operations of block 1630 may be performed according to the methods as described with reference to FIGS. 1 through 5. In certain examples, aspects of the operations of block 1630 may be performed by a transmission determining component as described with reference to FIGS. 6 through 8.

In some examples, aspects from two or more of the methods may be combined. It should be noted that the methods are just example implementations, and that the operations of the methods may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 as described with reference to FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:

receiving a first transmission from a first wireless device, the first transmission being one of a plurality of transmissions of a listen-before-talk (LBT) procedure between the first wireless device and a second wireless device;

identifying a transmission direction of the second wireless device based at least in part on a signal transmitted by the second wireless device in response to the first transmission;

estimating an interference level that would be imposed by a second transmission at the second wireless device;

determining whether to transmit the second transmission based at least in part on the estimated interference level, the first transmission, and the transmission direction of the second wireless device; and selecting a transmission power for transmitting the second transmission based at least in part on a direction of the second transmission and the transmission direction of the second wireless device.

2. The method of claim 1, further comprising:
monitoring one or more receiving directions, wherein the transmission direction of the second wireless device is identified based at least in part on the monitoring, and the interference level is estimated based at least in part on the transmission direction of the second wireless device.

3. The method of claim 2, further comprising:
receiving a request-to-send (RTS) or a clear-to-send (CTS) training signal from the second wireless device, wherein the transmission direction of the second wireless device is based at least in part on receiving the RTS or CTS training signal.

4. The method of claim 1, wherein:
the interference level is estimated based at least in part on a direction of the second transmission, the transmission direction of the second wireless device, the first transmission, or any combination thereof.

5. The method of claim 1, wherein:
the first transmission from the first wireless device is received during an LBT period.

6. The method of claim 1, wherein:
the first transmission from the first wireless device is received using an unlicensed radio frequency spectrum band.

7. The method of claim 1, wherein:
the first transmission from the first wireless device is received using a radio frequency spectrum band used by licensed and unlicensed networks.

8. The method of claim 1, wherein:
the second transmission comprises a directional transmission having a beam direction, wherein the determination to transmit the second transmission is based at least in part on the beam direction.

9. The method of claim 1, further comprising:
monitoring one or more receiving directions; and
determining that the first wireless device is transmitting the first transmission.

10. The method of claim 9, further comprising:
receiving a request-to-send (RTS) or a clear-to-send (CTS) training signal from the first wireless device, wherein determining that the first wireless device is transmitting is based at least in part on receiving the RTS or CTS training signal.

11. The method of claim 1, wherein:
the first transmission comprises a request-to-send (RTS) or a clear-to-send (CTS) message.

12. The method of claim 1, further comprising:
determining that the interference level is below a threshold; and
transmitting the second transmission based at least in part on the determination.

13. The method of claim 1, further comprising:
determining that the interference level is above a threshold; and
refraining from transmitting the second transmission based at least in part on the determination.

14. The method of claim 1, further comprising:
monitoring a plurality of directions across an angular coverage area according to a sweeping pattern.

15. The method of claim 14, wherein:
the plurality of directions comprises a subset of the directions within the angular coverage area.

16. The method of claim 15, further comprising:
selecting the plurality of directions based at least in part on a range of a calibration error, a lack of downlink/uplink beam correspondence, information received from a network entity, a collision history, or any combination thereof.

17. The method of claim 16, further comprising:
receiving a measurement report;
determining a receiving beam direction; and
determining the lack of downlink/uplink beam correspondence based at least in part on the receiving beam direction.

18. An apparatus for wireless communication, comprising:
means for receiving a first transmission from a first wireless device, the first transmission being one of a plurality of transmissions of a listen-before-talk (LBT) procedure between the first wireless device and a second wireless device;
means for identifying a transmission direction of the second wireless device based at least in part on a signal transmitted by the second wireless device in response to the first transmission;
means for estimating an interference level that would be imposed by a second transmission at the second wireless device;
means for determining whether to transmit the second transmission based at least in part on the estimated interference level, the first transmission, and the transmission direction of the second wireless device; and
means for selecting a transmission power for transmitting the second transmission based at least in part on a direction of the second transmission and the transmission direction of the second wireless device.

19. The apparatus of claim 18, further comprising:
means for monitoring one or more receiving directions, wherein the transmission direction of the second wireless device is identified based at least in part on the monitoring, and the interference level is estimated based at least in part on the transmission direction of the second wireless device.

20. The apparatus of claim 18, further comprising:
means for receiving a request-to-send (RTS) or a clear-to-send (CTS) training signal from the second wireless device, wherein the transmission direction of the second wireless device is based at least in part on receiving the RTS or CTS training signal.

21. The apparatus of claim 18, wherein:
the interference level is estimated based at least in part on a direction of the second transmission, the transmission direction of the second wireless device, the first transmission, or any combination thereof.

22. An apparatus for wireless communication, in a system comprising:
a processor;
memory in electronic communication with the processor; and
instructions stored in the memory and executable by the processor to cause the apparatus to:
receive a first transmission from a first wireless device, the first transmission being one of a plurality of transmissions of a listen-before-talk (LBT) procedure between the first wireless device and a second wireless device;

identify a transmission direction of the second wireless device based at least in part on a signal transmitted by the second wireless device in response to the first transmission;

estimate an interference level that would be imposed by a second transmission at the second wireless device;

determine whether to transmit the second transmission based at least in part on the estimated interference level, the first transmission, and the transmission direction of the second wireless device; and select a transmission power for transmitting the second transmission based at least in part on a direction of the second transmission and the transmission direction of the second wireless device.

23. The apparatus of claim 22, wherein the instructions are executable by the processor to cause the apparatus to:

monitor one or more receiving directions, wherein the transmission direction of the second wireless device is identified based at least in part on the monitoring, and the interference level is estimated based at least in part on the transmission direction of the second wireless device.

24. The apparatus of claim 22, wherein the instructions are executable by the processor to cause the apparatus to:

receive a request-to-send (RTS) or a clear-to-send (CTS) training signal from the second wireless device, wherein the transmission direction of the second wireless device is based at least in part on receiving the RTS or CTS training signal.

25. The apparatus of claim 22, wherein:

the interference level is estimated based at least in part on a direction of the second transmission, the transmission direction of the second wireless device, the first transmission, or any combination thereof.

26. A non-transitory computer-readable medium storing code for wireless communications, the code comprising instructions executable to:

receive a first transmission from a first wireless device, the first transmission being one of a plurality of transmissions of a listen-before-talk (LBT) procedure between the first wireless device and a second wireless device;

identify a transmission direction of the second wireless device based at least in part on a signal transmitted by the second wireless device in response to the first transmission;

estimate an interference level that would be imposed by a second transmission at the second wireless device;

determine whether to transmit the second transmission based at least in part on the estimated interference level, the first transmission, and the transmission direction of the second wireless device; and select a transmission power for transmitting the second transmission based at least in part on a direction of the second transmission and the transmission direction of the second wireless device.

27. The non-transitory computer-readable medium of claim 26, wherein the instructions are further executable to:

monitor one or more receiving directions, wherein the transmission direction of the second wireless device is identified based at least in part on the monitoring, and the interference level is estimated based at least in part on the transmission direction of the second wireless device.

28. The non-transitory computer-readable medium of claim 26, wherein the instructions are further executable to:

receive a request-to-send (RTS) or a clear-to-send (CTS) training signal from the second wireless device, wherein the transmission direction of the second wireless device is based at least in part on receiving the RTS or CTS training signal.

29. The non-transitory computer-readable medium of claim 26, wherein the interference level is estimated based at least in part on a direction of the second transmission, the transmission direction of the second wireless device, the first transmission, or any combination thereof.

* * * * *